United States Patent
Weichbrodt

[15] 3,699,806
[45] Oct. 24, 1972

[54] EARLY DETECTION OF DAMAGE TO MACHINE ELEMENTS IN ROLLING ENGAGEMENT

[72] Inventor: Bjorn Weichbrodt, 1038 Mahegan Road, Schenectady, N.Y. 12309

[22] Filed: March 27, 1970

[21] Appl. No.: 23,252

Related U.S. Application Data

[63] Continuation-in-part of Ser. No. 653,509, July 14, 1967, abandoned.

[52] U.S. Cl....................................................73/71.4
[51] Int. Cl.......................G01m 13/02, G01m 13/04
[58] Field of Search..........73/67, 67.2, 69, 71.2, 71.4

[56] References Cited

UNITED STATES PATENTS 3,208,268  9/1965  Tallian et al....................73/67

3,295,362  1/1967  Wood et al..................73/67.9

OTHER PUBLICATIONS

" Detection of Damage in Assembled Rolling Element Bearings" by Gustafsson et al., Asle Transactions Vol. 5 No. 1, pp. 197–209

*Primary Examiner*—James J. Gill
*Attorney*—Paul A. Frank, John F. Ahern and Julius J. Zaskalicky

[57] ABSTRACT

A system for detection of damage to a machine element in rolling engagement to another machine element utilizing the component of vibration produced by such damage. Successive cycles each including the component of vibration produced by the damage are summed to enhance and render detectable such component of vibration.

8 Claims, 20 Drawing Figures

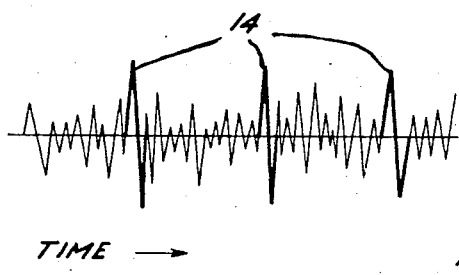
FIG. 3a
FIG. 3a'
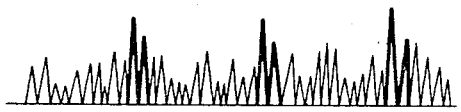
FIG. 3b
FIG. 3b'
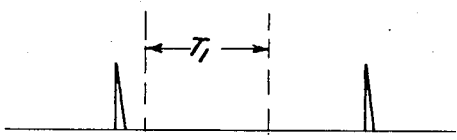
FIG. 3c
FIG. 3c'
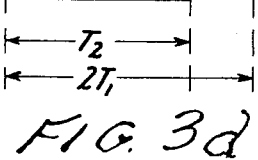
FIG. 3d
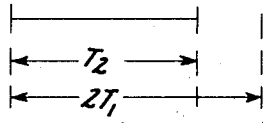
FIG. 3d'

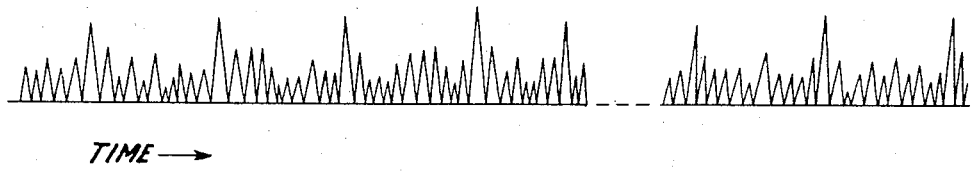
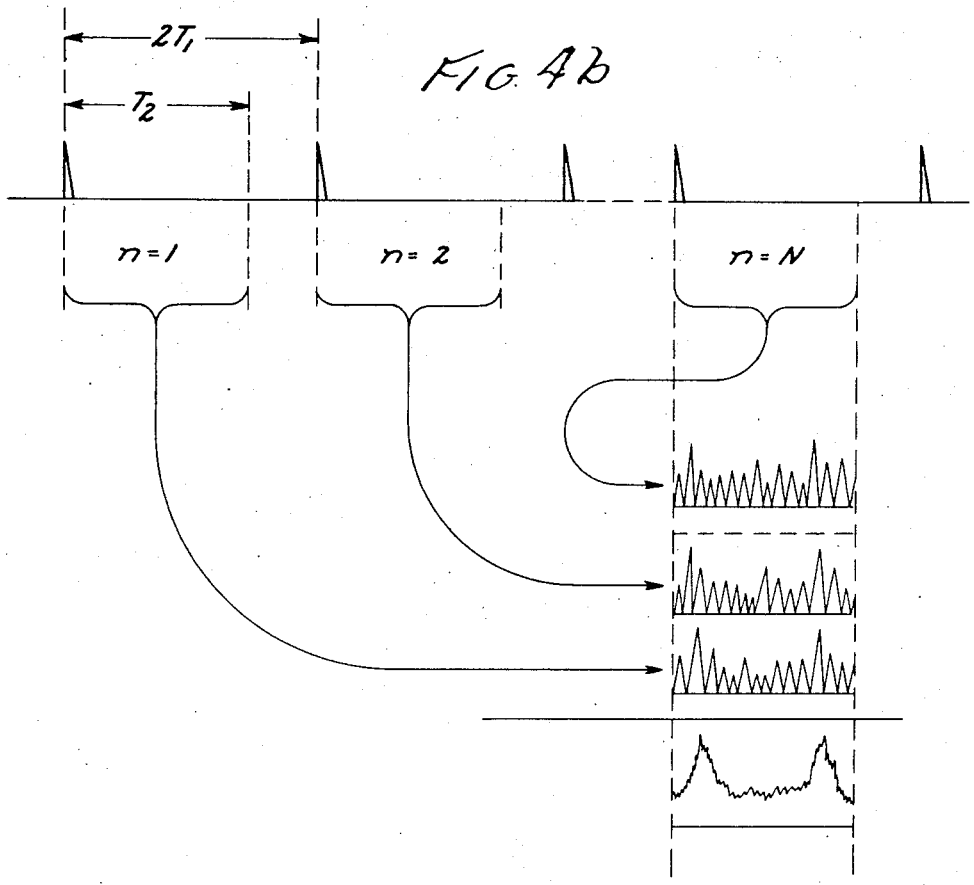

Inventor:
Bjorn Weichbrodt,
by
His Attorney.

EARLY DETECTION OF DAMAGE TO MACHINE ELEMENTS IN ROLLING ENGAGEMENT

This application is a continuation-in-part of my copending application Ser. No. 653,509 filed July 14, 1967, assigned to the assignee of the present invention, and now abandoned.

My invention relates to a detection system and particularly to a failure detection system for determining the time of probable failure of a rolling element in an assembly of engaging rolling elements such as a bearing or gear assembly.

The problem of detection of bearing failure has been recognized in the art for a long time. A patent to Tallian et al. U.S. Pat. No. 3,208,268 utilizes time domain analysis of bearing vibrations to detect flaws in the bearings. In his method, raw vibrations are passed through an analyzer and peaks which have a higher level than some predetermined value during a particular time period are counted and their number are compared to similar peaks during the remaining time periods. Obviously, in this method one must find a concentration of peaks before one can compare this concentration with the rest of the raw data. The peaks indicative of early bearing damage generally are small. This fact limits the sensitivity of such systems.

Moreover, a detection system of this type may fail if there is more than one dominating defect at each bearing surface. This happens because the concentration of peaks during the time area first isolated and containing one of the defects will not differ significantly from the corresponding peaks during the remaining time periods which now will include the other surface defects.

The problem of detection of gear failure also has been recognized in the art. Gear transmissions in apparatus such as jet engines and helicopters are generally very complex and contain a large number of gears. Because of high speed and light weight design, such transmissions often fail rapidly once a defect has started to develop. Defects may include cracks in gear teeth, scoring of teeth, and the like. It is of primary importance to detect such defects early without interrupting the normal operation of the transmission. Conventional techniques for monitoring the condition of a gear transmission include oil pressure and temperature measurements, overall vibration level measurements, and measurement of the gear transmission capability to perform its function without excessive friction. One of the disadvantages of such conventional techniques is that they usually detect the failure too late. While overall vibration signals contain information about the meshing of gears in the transmission, heretofore they have not been utilized and processed to make maximum use of the information content thereof. The present invention is directed to a system and method for processing the vibration signals which makes it possible to obtain a resultant signal clearly indicative of incipient failure.

Accordingly, an object of the present invention is to provide a means whereby vibration signals measured externally on an assembly of engaging rolling machine elements, such as gear transmissions and bearing assemblies, can be processed to provide information about the condition of the rolling elements.

Another object of the present invention is to provide such processing means as set forth above which can be easily automated.

Another of the present invention is to provide apparatus capable of determining incipient failure of machine elements in rolling engagement.

Another object of the present invention is to provide apparatus capable of detecting small surface defects in bearings while normally operating in noisy environments.

A further object of the present invention is to provide apparatus capable of determining the location of defects in rolling elements and in an assembly of such elements.

In carrying out my invention, as applied to the detection of damage to a bearing assembly, vibrations of the bearing assembly are sensed and converted into an electrical signal during the operation of the bearings. The electrical signal is filtered in a wide bandpass filter to enhance the significant signal components thereof. The filtered signal is rectified and supplied to a summation analyzer in which elements of the signal which are repetitive at a predetermined rate related to the periodicity of rotation of the rolling elements of the bearing under consideration are reinforced. The resultant signal is displayed on an oscilloscope or graphic recorder. Recurrence of a peak or peaks in such resultant signal provides an indication of incipient bearing failure.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein:

FIGS. 3a through 3d show the signal output at different stages of the apparatus of FIG. 2 when a defect exists in the bearing assembly of FIG. 1.

Figure 1:
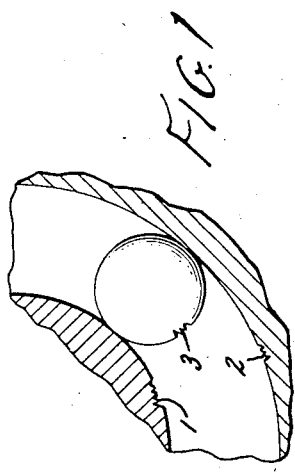
FIG. 1 is a sectional view of a bearing showing a portion of an inner race, a portion of an outer race and one ball.
Figure 2:
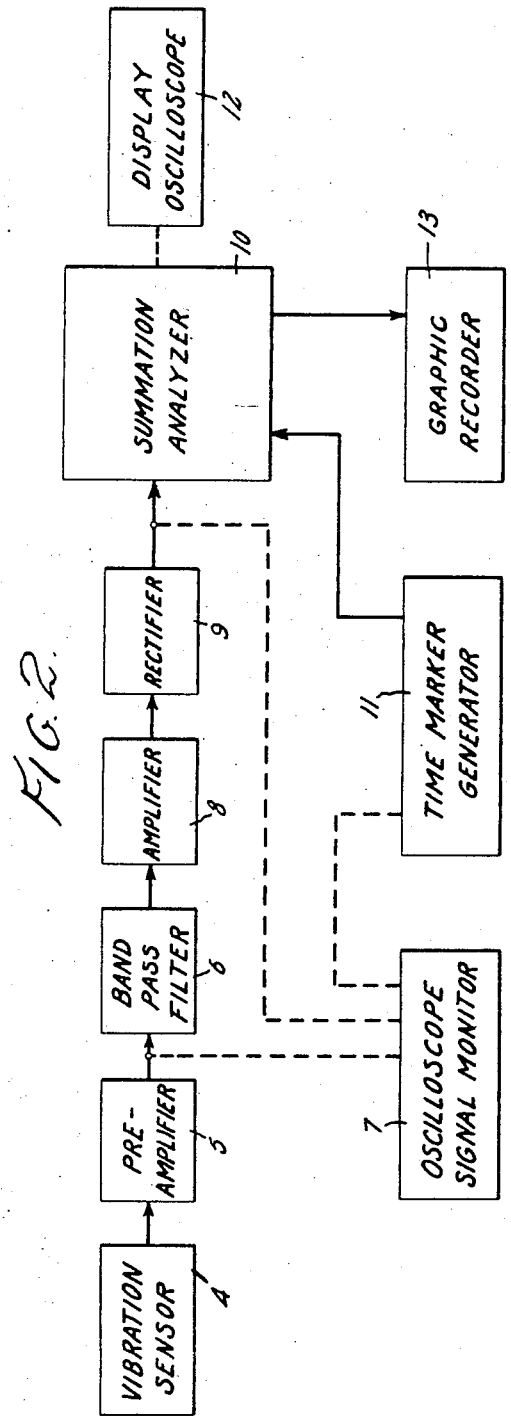
FIG. 2 is a block diagram of the apparatus of my invention.

FIGS. 3a' through 3d' show the corresponding signal output at the same stages of the apparatus of FIG. 2 when no defect exists in the bearing assembly of FIG. 1 or the apparatus is not synchronized with the periodicity of the defect.

FIG. 4a shows the signal output from the rectifier of the apparatus of FIG. 2 when a defect exists in the bearing assembly of FIG. 1.

FIG. 4b shows the periodicity of the time marker generator signal in relation to the periodicity of the peaks in the signal of FIG. 4a corresponding to a defect and in relation to the admittance time of the summation analyzer of FIG. 2.

FIGS. 5a through 5e show graphs of test results utilizing the disclosed method and apparatus.

Figure 6:
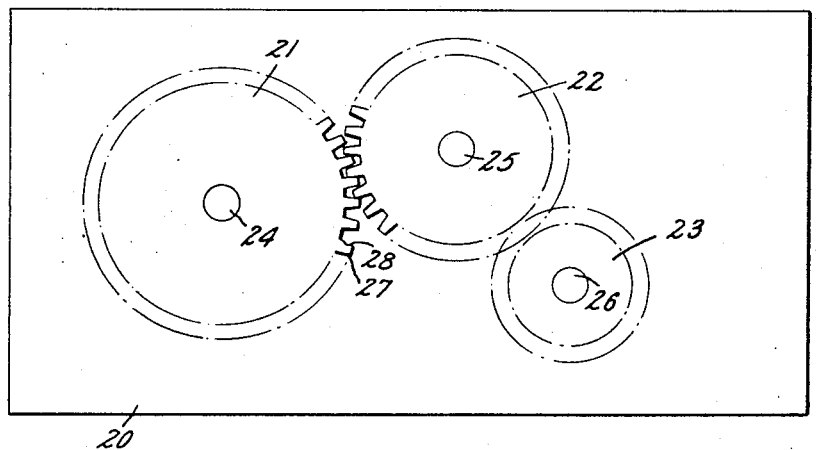

FIG. 6 is a sectional view of power transmission assembly including a plurality of gears one of which has a defect.

Figure 7A:

FIG. 7a shows a signal obtained from a transducer sensing the vibrations from the transmission or gear box assembly of FIG. 6.

Figure 7B:
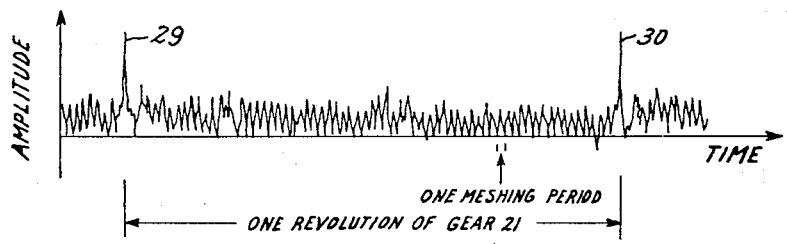

FIG. 7b shows the signal of FIG. 7a processed in accordance with the method and apparatus of the present invention to enhance the component of vibration produced by the defect in one of the gear elements.

A rolling element bearing, if properly designed and operated, performs its function with appreciable wear of the bearing surfaces. But even if the wear is negligible, the cyclic loads of the rolling elements passing over the bearing races cause fatigue of the material so that after some time surface defects begin to appear. These defects are at first few and local. The time before the initial defects occur may be greatly shortened by excessive temperature, lubrication failure, corrosion, etc., and can therefore normally not be calculated. Once the initial surface defects have developed, the bearing enters into a new phase of its life, characterized by considerably higher wear or destruction rate, and finally fails to perform its function. To predict bearing failure, it is therefore essential to detect the first surface defects while they are still few and local. In general, the defects are on the outer or inner race, however, occasionally a defect occurs upon a ball itself. FIG. 1 shows defects located on both the inner race 1, outer race 2 and one of the balls 3. Such a situation is very uncommon but is shown for purposes of illustration. This instrument is capable of detecting any such defects.

My invention makes use of the fact that an impact is generated every time a defect in an otherwise smooth surface comes into rolling contact with any other smooth surface. For example, a dent in the outer race of a ball bearing generates an impact every time a ball rolls over it. As a result of the symmetrical shape of a bearing, each defect generates a sequence of impacts, approximately equally spaced in time, provided that the bearing rotates with almost constant speed. The time interval between two subsequent impacts depends on the bearing speed, geometry and the location of the impact. For a particular bearing and speed of rotation, three impact repetition rates can be calculated, corresponding to a defect in the inner race, outer race or rolling element respectively. The detection method specifically extracts from the bearing vibrations those transients repeating with a frequency near to either of these three calculable repetition rates, and therefore is sensitive to indications of bearing defects, but insensitive to other vibrations.

The block diagram of FIG. 2 shows an embodiment of apparatus for detecting defects in rolling element bearings. In this embodiment a vibration sensor 4 is placed at some point on the structure of the bearing or its support so that vibrations generated by the bearing can be picked up and fed into the apparatus. This sensor may be placed on the machine of which the bearing is a part. The vibration sensor feeds the signals which it has received into a preamplifier 5. From this preamplifier the signal is conducted directly to a band pass filter 6 which allows the frequency range of interest to pass and thus performs an initial enhancing of the information to noise level ratio of the signal. From the preamplifier the signal may be fed also into a signal monitor oscilloscope 7 so that a visual check of the operating elements of the circuit may be made. After passing through the band pass filter, the signal is amplified by amplifier 8 and then conducted to a rectifier 9. The rectification serves to avoid signal cancellation in the commercially available summation analyzer 10 which otherwise might happen if consecutive signal elements to be summed are not exactly identical. This function of the rectifier will become evident in the following discussion. The rectified signal is next conducted to the summation analyzer 10.

The bearing under test has known geometry, both as to inner and outer race, roller or ball diameter, ball contact angles and number of balls, and from this information it is possible to compute the time interval for full rotation of balls and ball cage at a certain operating RPM. Thus, the expected time intervals between consecutive impacts generated by defects in outer race, inner race, or balls are known. By setting a commercially available time marker generator 11, which may be a pulse generator with a preset counter in series, programmable to generate a preset number of pulses with a certain rate to the proper time interval, a signal coming from the rectifier can be broken into appropriate segments and these segments can be summed to each other by the summation analyzer 10.

In the present state of the art the summation analyzer is limited in the time intervals for which it can be programmed. However, any time interval can be established by the use of the time marker generator 11 for triggering of each cycle of the summation analyzer. For this reason, the time marker generator is set for the most appropriate pulse repetition time for the inner race, outer race or ball depending upon which is being examined. The signal admittance time of the summation analyzer 10 is set by specific increments to be of smaller duration than the pulse repetition of the time marker generator but as close to it as possible. When the summation analyzer has completed one sweep it stops and waits for the next triggering pulse from the time marker generator. In this way, reinforcement of certain periodic or almost periodic signals from the vibration sensor is obtained. After these signals have been summed, the summation signal is displayed upon the oscilloscope 12 and each peak indicates a defect. The degree of a peak and the number of peaks can again be determined and the time before total failure can be calculated or estimated by reference to the peak magnitude in combination with other factors.

In this way, total failure can be anticipated and a new bearing can be inserted at the convenience of the operator rather than waiting until near total failure when bearing insertion may or may not be convenient and secondary damage to other machine parts might have occurred.

The signal may also be fed to a graphic recorder 13 which will make plots of the signal for reference usage.

The graphs shown in FIG. 3 are taken at various stages of the apparatus. The first half on the left shows the signal output where there is a defect in the race. The second half on the right shows the corresponding signal output without any particular defect in the race. FIG. 3a shows the signal output from the amplifier. The repeating peaks 14 caused by defects are exaggerated for purposes of illustration.

FIG. 3b shows the signal outputs from the rectifier.

The signal output from the rectifier is fed into the summation analyzer. Ideally, the time marker generator is set to a signal interval exactly coinciding with the frequency of repetition of the point on the inner race, outer race or ball at which a defect may lie. However, the summation analyzer commercially available today operates only in discrete increments of time. For example, as shown in FIG. 3c, $T_1$ is the expected repetition time interval of the defect and the time $T_2$ is one of the signal admittance times available on the summation analyzer. $T_2$ must be set to be greater than $T_1$ and should be less than $2T_1$. $T_1$ shown in the figure or a multiple thereof must be set on the time marker generator in order to enhance the defect. In the examples shown, the time marker generator is set at $2T_1$. In this way the summation analyzer is triggered by the time marker generator with an interval $2T_1$, the signal interval $T_2$ is received by the analyzer during its active interval $2T_1$. When the time interval $2T_1$ has passed, the time marker generator triggers the summation analyzer again to repeat the cycle. The lower graph shown in FIG. 3d is the output from the summation analyzer memory showing a single defect in the time $T_1$ with triggering pulses shown at FIG. 3c. When the input is random noise only or repeating with a period different from $T_1$, the output from the summation analyzer is a relatively flat graph of FIG. 3a'. In this graph, the random noises which cause peaks in the raw vibration wave form will be cancelled out by other random noises.

The process taking place within the summation analyzer is shown graphically in FIG. 4 wherein FIG. 4a is a signal output from the rectifier which signal output includes flaw signals.

The FIG. 4b shows the time marker generator signal generated where it is set to $2T_1$ and $T_1$ is the period of frequency of the flaw in the inner race, outer race or ball. When the time marker generator gives a signal, the summation analyzer begins its operation. Thus, as the signal is fed in from left to right, a first signal fed into the summation analyzer is shown as $n = 1$. The second signal fed into the summation analyzer is $n = 2$ and the last signal $n = N$. After summation of the N segments, the summation analyzer memory content will be the envelope shown at the bottom of FIG. 4b. This envelope shows a time $T_2$ which is greater than the cyclic time $T_1$ thus showing a single defect one or more times. In the event of multiple defects they will be shown each one or more times and are easily discernable on a graphic recorder or on an oscilloscope screen.

An illustration of bearing malfunction detection as displayed on a graphic recorder is found in FIG. 5. The Figure shows five recordings across a paper. FIGS. 5a–5c show the output from a summation analyzer where the bearing has two dents approximately $10^{-3}$ inches deep in the outer race. The time $T_1$ is in this instance the time necessary for two consecutive balls to pass over the same defect. As shown in FIG. 5a, the amplitude of the indication in each of the dents is approximately the same.

Figure 5A:
Figure 5B:
Figure 5C:
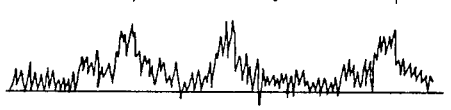
Figure 5D:

The next graphic representation in FIG. 5b shows the same bearing on retest. The general wave form is unchanged. The angular distance between the defects is the same thus the space between peaks is unaltered but the phase is different causing the peaks to be located at different points on the horizontal. This phase difference between FIGS. 5a and 5b is caused by the time marker generator giving its signal at a different time in the cycle of the turning of the ball against the defective outer race. FIG. 5c shows a trace of the same run as the preceding trace, however, the time marker generator must stop and start again so that the phase has shifted again. The time $T_1$ is marked between different peaks as shown. The trace of FIG. 5d shows the effect of slightly off center timing where $2T_1$ is reduced by approximately 2 percent. In this tracing the signal from the defects is hardly discernable. If the timing had been offset slightly in a positive direction, a similar result would be obtained. It is readily appreciated that proper timing is necessary if nearly exact repetition of defect signals is to be traced out by the summation analyzer in a manner to give reinforcement of signals sufficient to cause a clear indication of each defect which is beginning to form.

Figure 5E:

FIG. 5e shows the output from the summation analyzer of this bearing before defects were made in the bearing. The bearing was operated under the same conditions as the first three test runs illustrated above in FIGS. 5a–5c. This test shows the background noise, no peaks and no defects.

It must be realized that this method assumes a small number of defects and is intended for the detection of incipient failure early in the failure period and well before total failure. If there are numerous defects, these defects can be detected aurally and when so detected, total failure is indicated as imminent.

It is understood that the signal filtered through the band pass filter can be of varying frequencies depending upon the characteristics of the bearing being tested. Failure information may be in different frequency bands depending on size and material of the bearing under test. As an example, if the ball bearing under test has a diameter of approximately 4 inches and rotates with 1,500 RPM, an appropriate band pass is 100–5,000 cycles per second. In the practical application of the detection method, the correct repetition time intervals for bearing defects can normally not be calculated exactly. For example, it is not unusual that a slight sliding occurs between rolling elements and races. In addition, a bearing does not always rotate with exactly constant and known speed. Therefore, the impact sequence generated by a bearing defect is generally only almost periodic with almost the calculated periodicity. Therefore, it is practical and an essential part of the method to set the system to run two or more trials, one or more on each side of the estimated time period and then one exactly at the time period to make sure that the actual cyclic time of the bearing element has been included.

A limited number of time cycles is used because of the lack of exact repeatability of peaks due to slip effects and slight errors in the time cycle set into the apparatus accumulate with a large number of cycles. If a very large number of cycles is used, then the results may be obscured by the progressive misalignment of peaks relative to each other and resulting malfunction indication is made less clear.

It was mentioned previously that rectification of the signal serves to avoid possible cancellation during the summation of consecutive segments due to lack of perfect repeatability. It is conceivable, however, that in certain cases the repeatability may be so good that results can be obtained even without rectification.

In cases where the initial signal to noise ratio from the sensor is sufficient the band pass filter may be omitted from the system.

One outstanding advantage of my invention, as described above, is that by the use of signal summation, the detection method does not rely on the existence of only one defect or a certain configuration in each bearing surface, nor is it required to identify any particular start time in the raw vibration signal. The analysis sequence may be started at a completely arbitrary moment while the bearing is rotating.

Reference is now made to FIG. 6 which shows a gear transmission 20 including a plurality of gears 21, 22 and 23. The gears are mounted on respective shafts 24, 25, and 26 supported in bearings (not shown) in the housing of the transmission. Gear 21 meshes with gear 22, which in turn meshes with gear 23. Power may be applied to the shaft 24 and taken from the shaft 26. Gear 21 has the largest number of teeth and gear 23 has the smallest number of teeth. The tooth 27 of gear 21 has a surface defect 28, for example, it is scored, which provides an uneven meshing surface with the teeth of gear 22. Rotation of the gear 21 at constant speed produces a series of impacts equally spaced in time. As in the case of the technique for the detection of defects in bearing assemblies, described above, the detection of defects in gears specifically extracts from the gear train vibrations repeating with a frequency equal to or close to the rotation rate or periodicity of the gear under test and therefore would be insensitive to vibrations of other gears and of other moving parts of the transmission.

The apparatus of FIG. 2 is applied to processing the vibrations from the housing of the gear transmission 20 in the same manner as applied to the processing of the vibrations of the bearing assembly. The sensor 4 is connected to the housing of the gear transmission to pick up vibrations therefrom. The time marker generator 11 is synchronized with the rotation of the shaft of gear 21 so that each summation cycle of the summation analyzer is started at the same phase of rotation of the gear. Preferably, complete successive cycles of vibrations from the gear housing, each initiating at the same phase or rotation of the gear under test, are summed in the summation analyzer 10. A tachometer may be connected to the shaft 24 and the time marker generator 11 may be synchronized therewith to provide precise timing for the summation analyzer 10.

FIG. 7a shows a graphical representation of the signal obtained from the vibration sensor 4 connected to the housing gear transmission assembly 20. The abscissa of the graph represents time and the ordinate represents amplitude.

FIG. 7b shows the resultant signal segment appearing in the graphic recorder 13, or in the display oscilloscope 12 of FIG. 2, and particularly shows peaks 29 and 30 coinciding with the meshing cycles of the gear 21 in which the tooth 27 with a defect 28 meshes with the corresponding tooth in the gear 22. The number of summation cycles needed to bring out the peaks representing defects varies from case to case. Conveniently, a hundred cycles may be used. With a larger number of cycles, greater sensitivity is obtained with respect to detecting defects in the teeth of the gear. Of course, when more than one defect appears, more than one peak will appear over a summation cycle. The location of a peak in relation to the initiation of the trace which forms the display will correspond to the angular displacement of tooth with defect in relation to zero phase angle reference used for initiation of the trace.

In FIG. 7b the time duration between the peaks 29 and 30 represents the duration of one cycle of rotation of the gear 21. The peaks 29 and 30 represent the same defect. Of course, to ascertain the condition of each of the other gears, the timing generator 11 would be synchronized with the rotation of the gear under test and the same summation and display technique would be utilized to ascertain the condition of the teeth of the gear as described for gear 21.

While the invention as applied to detection of defects in gears which would product incipient failure thereof has been illustrated in connection with a gear transmission showing three gears, it will be appreciated that the invention is useful and particularly applicable to transmission having many gears. The technique enables detection of signal producing defects even when not normally discernible in the total vibration signal and in the presence of signals and noise produced by the many other elements of the transmission.

While the invention has been described in specific embodiments, it will be appreciated that many modifications may be made by those skilled in the art and I intend by the appended claims to cover all such modifications and changes as fall within the true spirit and scope of the invention.

What I claim as new and desire to secure by Letters Patent of the United States is:

1. A system for detecting damage to a rolling element in a pair of engaging rolling elements, said damage producing a component of vibration having a periodicity corresponding to the periodicity of the rotation of said rolling element, a vibration sensor coupled to said rolling element for sensing vibrations thereof and converting said vibrations into an electrical signal, means for segmenting said electrical signal into a plurality of signal segments, each signal segment starting at the same phase of rotation of said rolling element, each signal segment including a plurality of signal elements occurring in sequence, means for summing corresponding signal elements of said signal segments coinciding with a respective phase position of said rolling element to produce a plurality of resultant signal elements, each corresponding with a respective phase position of said rolling element, means for combining said resultant signal elements to produce a resultant signal segment, said resultant signal segment having a duration equal to the duration of one of said signal segments and includes at least a peak corresponding to said component of vibration.

2. The combination of claim 1 in which said rolling element is a rolling element of a bearing.

3. The combination of claim 1 in which said pair of rolling elements are gears in which the teeth of one of said gears engage the teeth of the other of said gears.

4. The combination of claim 1 in which said segmenting means segments said electrical signal into segments having a duration which is at least equal to the period of rotation of said element of said engaging rolling elements.

5. The combination of claim 1 in which said summing means includes a summation analyzer which sums the corresponding signal and elements of a plurality of signal segments applied thereto in sequence and stores the resultant segmented signal therein and in which said signal segmenting means includes a source of regularly recurring impulses, each impulse synchronized with the occurrence of said component of vibration and initiating the summation sequence of the summation analyzer on said electrical signal applied thereto.

6. A system for detecting damage to a rolling element bearing supporting a rotating shaft thereon, said damage producing a vibration having a frequency related to the periodicity of the rotation of said shaft comprising a vibration sensor coupled to said bearing for sensing vibrations therein and converting said vibrations into an electrical signal, filter means for passing the frequency components of said signal lying with a predetermined band of frequencies including said frequency to produce a first resultant signal, means for segmenting said first resultant signal into a plurality of signal segments, each signal segment starting at the same phase of rotation of said shaft, each signal segment including a plurality of signal elements occurring in sequence, means for summing corresponding signal elements of said signal segments coinciding with a respective phase position of said shaft to produce a plurality of resultant signal elements, each corresponding with a respective phase position of said shaft, means for combining said resultant signal elements to produce a resultant signal segment, said resultant signal segment having a duration equal to the duration of one of said signal segments and includes at least a peak corresponding to said vibration.

7. The combination of claim 6 in which said bandpass filter passes signal components of frequencies of 100 to 5,000 cycles.

8. The combination of claim 6 in which means are provided for rectifying said first resultant signal and applying said rectified signal to said signal segmenting means.

* * * * *